(12) United States Patent
Vedula

(10) Patent No.: US 11,595,559 B2
(45) Date of Patent: Feb. 28, 2023

(54) TAMPER-RESISTANT INDICATORS FOR ELECTRONIC DEVICES

(71) Applicant: Apple Inc., Cupertino, CA (US)

(72) Inventor: Srinivas Vedula, Fremont, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/214,775

(22) Filed: Mar. 26, 2021

(65) Prior Publication Data

US 2022/0094833 A1 Mar. 24, 2022

Related U.S. Application Data

(60) Provisional application No. 63/082,422, filed on Sep. 23, 2020.

(51) Int. Cl.
| | |
|---|---|
| *H04N 5/232* | (2006.01) |
| *H04N 5/225* | (2006.01) |
| *G01J 1/42* | (2006.01) |
| *G06F 21/62* | (2013.01) |
| *G06F 1/16* | (2006.01) |
| *G06F 1/18* | (2006.01) |
| *G01J 1/44* | (2006.01) |

(52) U.S. Cl.
CPC ............ *H04N 5/232* (2013.01); *G01J 1/4204* (2013.01); *G01J 1/44* (2013.01); *G06F 1/1686* (2013.01); *G06F 1/189* (2013.01); *G06F 21/6245* (2013.01); *H04N 5/2252* (2013.01); *H04N 5/2256* (2013.01); *H04N 5/2257* (2013.01)

(58) Field of Classification Search
CPC .... H04N 5/2252; H04N 5/232; H04N 5/2256; H04N 5/2257; G01J 1/4204; G01J 1/44; G06F 1/1686; G06F 1/189; G06F 21/6245
See application file for complete search history.

(56) References Cited

U.S. PATENT DOCUMENTS

| | | | |
|---|---|---|---|
| 10,048,696 B2 | 8/2018 | Meyhofer et al. | |
| 10,367,986 B1* | 7/2019 | Berenberg | ............... G08B 5/36 |
| 10,544,923 B1 | 1/2020 | Barrowman | |
| 2007/0152840 A1 | 7/2007 | Fleischman et al. | |
| 2011/0228354 A1 | 9/2011 | Fukui | |
| 2019/0072836 A1* | 3/2019 | Karp | ..................... G03B 11/045 |
| 2019/0171804 A1 | 6/2019 | Lee et al. | |
| 2020/0234659 A1 | 7/2020 | Ju et al. | |

OTHER PUBLICATIONS

International Search Report and Written Opinion from PCT/US2021/045056, dated Nov. 11, 2021, 13 pages.

* cited by examiner

*Primary Examiner* — Nelson D. Hernández Hernández
(74) *Attorney, Agent, or Firm* — BakerHostetler

(57) ABSTRACT

Aspects of the subject technology relate to a tamper-resistant indicator of recording by a camera. Electronic devices are disclosed that include a camera, an indicator light for the camera, and a light sensor. The light sensor is disposed proximate to the indicator light so that blocking or masking the indicator light also prevents light from reaching the light sensor. In this way, the light sensor can be used to detect tampering with, masking, blocking, destroying, or otherwise preventing the indicator light from indicating when the camera is recording.

23 Claims, 5 Drawing Sheets

TAMPER-RESISTANT INDICATORS FOR ELECTRONIC DEVICES

CROSS REFERENCE TO RELATED APPLICATIONS

This application claims the benefit of priority to U.S. Provisional Patent Application No. 63/082,422, entitled "Tamper-Resistant Indicators for Electronic Devices," filed on Sep. 23, 2020, the disclosure of which is hereby incorporated herein in its entirety.

TECHNICAL FIELD

The present description relates generally to electronic devices, and more particularly, but not exclusively, to tamper-resistant indicators for electronic devices.

BACKGROUND

Electronic devices such as desktop computers, laptop computers, smartphones, and tablet computers are often provided with cameras. Electronic devices with cameras can include an indicator light to indicate when the camera is recording, to alert the user and/or others in the vicinity of the camera that they may be being recorded. However, conventional devices having cameras and indicator lights can be vulnerable to tampering to disable the indicator light, which can expose the user or others to being recorded without notification.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides systems, devices, and methods for prevention of masking, disabling, destroying, and/or otherwise tampering with a visual indicator that a camera is recording or otherwise capturing images or other information. In one or more implementations, a light sensor is provided in close proximity to a visual indicator (e.g., a light source such as a light-emitting diode (LED) configured as an indicator light for the camera) and coupled to the camera, such that insufficient light received by the light sensor disables the camera. In this way, if the indicator light is covered, masked, or damaged (e.g., in an attempt to allow the camera to record and/or capture other information such as images, sound, depth or other information without an indication of recording by the indicator light), the light sensor resultantly disables operation of the camera.

Figure 1:
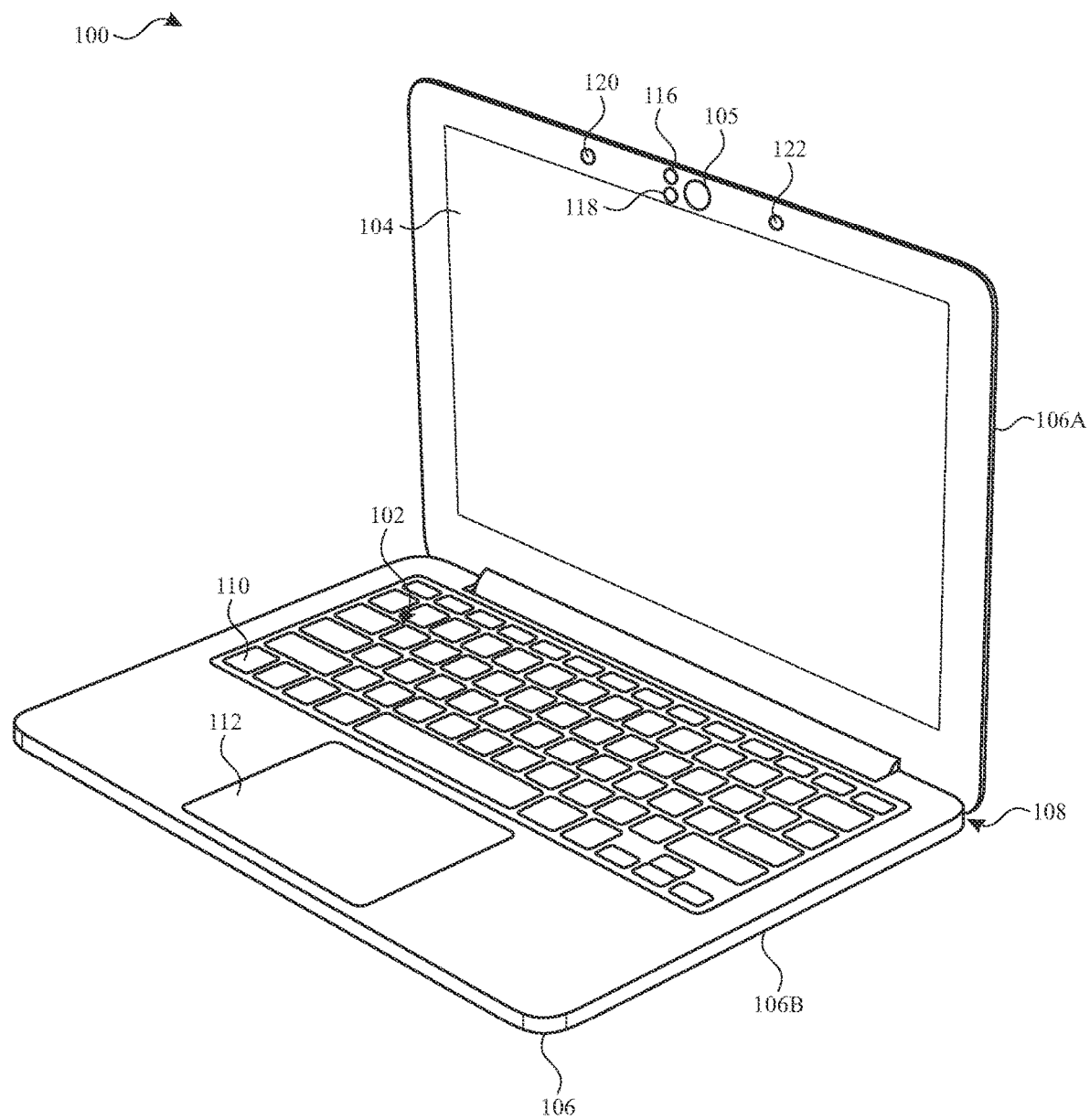
FIG. 1 illustrates a perspective view of an example electronic device in accordance with various aspects of the subject technology.

An illustrative electronic device that can implement the subject matter described herein is shown in FIG. 1. In the example of FIG. 1, device 100 has been implemented in the form of a portable computer. As shown in FIG. 1, electronic device 100 may include keyboard 102 with keys 110, display 104, housing 106, and a touch pad such as touch pad 112. As shown in FIG. 1, display 104 may be mounted on the front of housing 106.

Housing 106, which may sometimes be referred to as a case, may be formed of plastic, glass, ceramics, fiber composites, metal (e.g., stainless steel, aluminum, etc.), other suitable materials, or a combination of any two or more of these materials. Housing 106 may be formed using a unibody configuration in which some or all of housing 106 is machined or molded as a single structure or may be formed using multiple structures (e.g., an internal frame structure, one or more structures that form exterior housing surfaces, etc.). As shown in FIG. 1, housing 106 may have multiple parts. For example, housing 106 may have upper portion 106A and lower portion 106B. Upper portion 106A may be coupled to lower portion 106B using a hinge that allows upper portion 106A to rotate about rotational axis 108 relative to lower portion 106B. Keyboard 102 and touch pad 112 may be mounted in lower portion 106B, in some implementations.

Display 104 may be a touch screen that incorporates capacitive touch electrodes or other touch sensor components or may be a display that is not touch-sensitive. Display 104 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Display 104 may have openings (e.g., openings in the inactive or active portions of display 104) such as an opening to accommodate a button or one or more openings to accommodate cameras such as camera 105, light sources such as light source 116 (e.g., an indicator light for the camera), light sensors such as light sensor 118 associated with the light source 116, and/or other light sensors such as ambient light sensor 120.

Camera 105 and/or other cameras disposed around or behind the display may be operated by electronic device 100 to capture images (e.g., including still images and/or video image frames), record sound, and/or capture other information such as depth information for an environment around the electronic device. Electronic device 100 may also include a flash 122 that generates light to illuminate a scene for imaging and/or other recording by the camera 105.

Light source 116 may include one or more LEDs and/or other sources of light, and may be configured as an indicator light for the camera 105. For example, light source 116 located near the camera and/or may be hardwired to camera 105 so that the light source 116 operates (e.g., to project light out of the housing 106) at all times during which the camera 105 is operating (e.g., capturing images and/or other information). In this way, a user of the electronic device 100 and/or others within or near the field of view of camera 105 can be visually notified that they may be being recorded.

In some scenarios, a user of the device or another actor may attempt to operate the camera 105 without alerting the user or others that the camera is operating, by attempting to disable, destroy, or mask the light source 116. Such an attempt can be a physical attempt made by a person at the physical location of the electronic device 100 (e.g., by placing a finger or a material such as tape, ink, or paint over the light source 116 or by physically destroying the light source) to prevent the light from being generated by the light source and/or projected from the housing 106. Such an attempt can alternatively be an electronic attempt made by a person or machine at the location of the electronic device 100 or at another location by attempting to reprogram software and/or firmware at the device to allow operation of the camera 105 without operating the light source 116.

In accordance with one or more implementations, the electronic device 100 of FIG. 1 implements one or more components and/or processes as described herein to prevent physical and/or electronic attempts to operate camera 105 without the operation of a corresponding indicator light (e.g., light source 116).

For example, as shown in FIG. 1, electronic device 100 includes a light sensor 118. Light sensor 118 may disposed adjacent to the light source 116 and arranged to receive light from the external environment of electronic device 100. Light source 118 may be configured to disable the camera 105 if, for example, an amount of light received by the light sensor is below a threshold. For example, in one or more implementations, the light source 116 and the light sensor 118 are co-located within the housing 106 in sufficient proximity that masking or destroying the light source 116 (e.g., to prevent the projection of the light out of the housing 106) correspondingly masks or destroys the light sensor 118.

For example, if a finger or a piece of tape is placed over the light source 116, due to the position of the light sensor 118 in proximity to (e.g., adjacent to) the light source 116, the light sensor 118 will also be blocked from receiving light from the environment external to the electronic device 100. The amount of light received by light sensor 118 from the external environment may then fall below the threshold, resulting in disabling of the camera 105.

In one or more implementations, electronic device 100 may also include an ambient light sensor 120. The ambient light sensor 120 may also receive light (e.g., ambient light) from the environment external to the electronic device 100, and may be used to measure the amount of ambient light. In one or more implementations, the threshold for light sensor 118 to disable the camera 105 may be adjustable based on the amount of ambient light detected by the ambient light sensor 120. For example, the threshold may be adjustable (e.g., adjustable downward toward or to a non-zero lower limit when the ambient light sensor 120 detects low amounts of ambient light) to allow the camera to be operated in low-light scenarios (e.g., scenarios in which the light sensor 118 receives low amounts of light from the external environment) as long as the light source 116 is operating and projecting light out of the housing 106. In one or more implementations, the adjustable threshold may include an adjustable upper threshold and an adjustable lower threshold, so that that the light sensor 118 only allows the camera 105 to operate if the amount of light received by the light sensor 118 is within a range of the amount of ambient light detected by the ambient light sensor 120. In this way, if the amount of light received by the light sensor 118 is substantially less than the amount of light received by the ambient light sensor 120 (e.g., if the light sensor 118 and light source 116 are covered/masked and the ambient light sensor is not covered/masked in an environment with substantial detectable ambient light) or if the amount of light received by the light sensor 118 is substantially more than the amount of light received by the ambient light sensor 120 (e.g., due to reflection of light from a covering or masking over the light source 116 onto the light sensor in a low light environment in which the ambient light sensor detects a small amount of ambient light or no ambient light), the camera can be disabled or otherwise prevented from operating and/or communicating with the system circuitry of the device.

In one or more implementations, the light sensor 118 may also be arranged to receive light from the light source 116 when the light source 116 is generating light. The light sensor may be arranged to disable the camera 105 when an amount of the light from the light source 116 is below a second threshold. In this way, the light sensor 118 can also, or alternatively, prevent operation of the camera 105 by directly detecting whether light is being generated by the light source 116. In one or more implementations, the light sensor 118 may receive the light from the external environment and the light from light source 116 so that the light sensor 118 can be used to verify both that the light source 116 is generating light and is not covered, masked, or blocked from projecting the light out of the housing.

The configuration of electronic device 100 in the example of FIG. 1 is merely illustrative. In other implementations, electronic device 100 may be implemented in the form of a computer such as a computer that is integrated into a display such as a computer monitor, a tablet computer, a smart phone, a somewhat smaller portable device such as a wristwatch device, pendant device, or other wearable or miniature device, a media player, a gaming device, a navigation device, a computer monitor, a television, or other electronic equipment.

Figure 2:
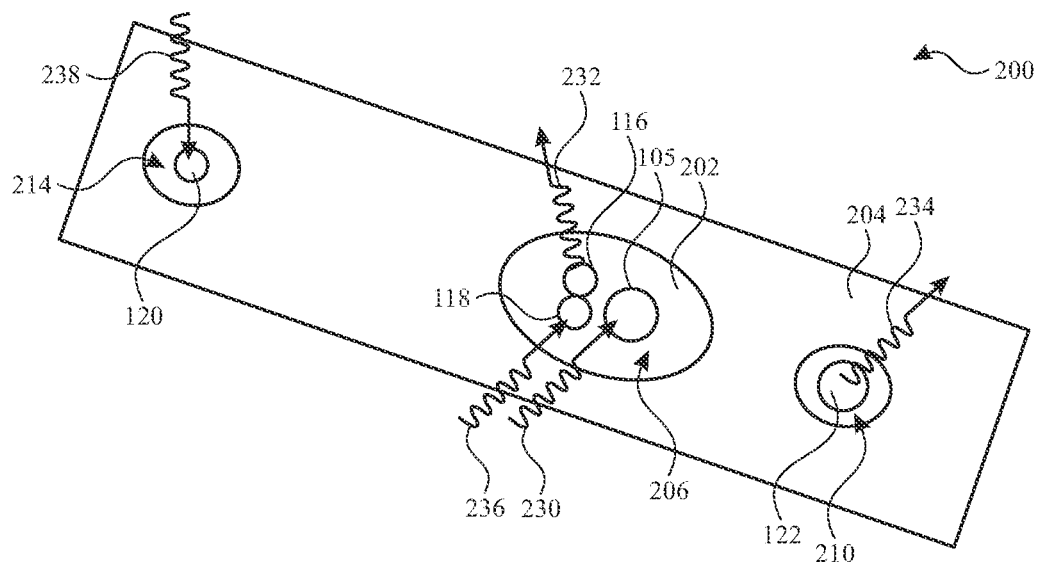
FIG. 2 illustrates a top view of a portion of an example electronic device having camera, a light source, and a light sensor in accordance with various aspects of the subject technology.

FIG. 2 illustrates a top view of a portion 200 of the housing 106 of electronic device 100 (e.g., a portion of the housing formed by a portion of the display 104). As shown in FIG. 2, the camera 105, the light source 116, and the light sensor 118 may be disposed adjacent to an opening 206 in the portion 200 of the housing 106, the opening allowing light to pass therethrough from the light source out of the housing, and from the external environment into the housing.

Opening 206 may be formed from, for example, a hole in an opaque portion of the housing, or may be an opening in a masking layer on a transparent layer of the housing. In the example of FIG. 2, the opening 206 is an opening in a masking layer 204 that is formed on a transparent portion 202 of the housing. The transparent portion 202 may, for example, be a cover glass layer of display 104. In this example, the masking layer 204 includes the opening 206 that is aligned with the light source 116 and the light sensor 118, to allow light 236 to pass through the opening 206 to the light sensor 118 and to allow light 232 to pass through the opening 206 from the light source 116. In the example of FIG. 2, camera 105 is adjacent to the same opening 206 as the light source 116 and the light sensor 118, to allow the camera 105 to receive light 230 through the opening. In other implementations, the camera 105 may be disposed adjacent to a separate opening from the opening 206 for the light source 116 and the light sensor 118. Because the light source 116 and the light sensor 118 are co-located within the housing 106 in sufficient proximity that masking or destroying the light source 116 to prevent the projection of the light 232 out of the housing 106 correspondingly masks or destroys the light sensor 118, the light source 116 and 118 may be disposed in sufficient proximity to share a single opening 206 in the masking layer 204 (or a single hole in an opaque portion of the housing).

In the example of FIG. 2, the flash 122 is disposed adjacent a separate opening 210 and configured to project light 234 out of the housing to illuminate a scene for imaging by the camera 105 in some operational scenarios (e.g., when a low light condition is detected using ALS 120 and/or based on a user flash setting) The flash 122 can be disabled by a user via, for example, an application running on system circuitry for the device. In the example of FIG. 2, the ALS 120 is disposed adjacent to another opening 214 so that light 238 (e.g., ambient light) can pass through the opening 214 to the ALS 120. In various other implementations, the ALS 120, the flash 122, the camera 105 can be disposed adjacent to and/or within one, two, or three openings in common with or separate from the opening 206 for the light source 116 and the light sensor 118.

Figure 3:
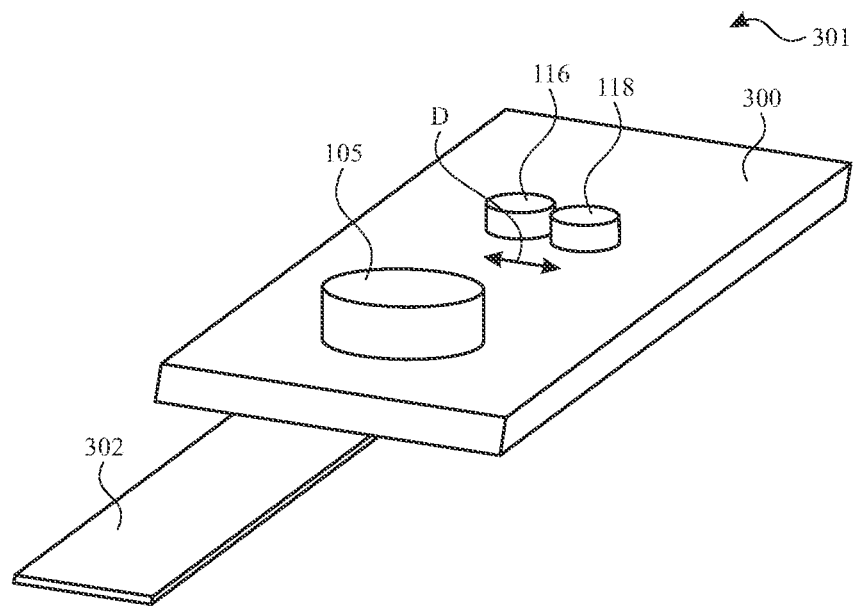
FIG. 3 illustrates a perspective view of an example of an imaging component for an electronic device in accordance with various aspects of the subject technology.

In one or more implementations, the light source 116 and the light sensor 118 may be disposed in close proximity by forming the light source 116 and the light sensor 118 on a common substrate. FIG. 3 illustrates an implementation of a light source 116 and a light sensor 118 that are disposed adjacent to each other on a common substrate 300. In the example of FIG. 3, camera 105 is formed on the same common substrate 300 as the light source 116 and the light sensor 118. However, in other implementations, the camera 105 may be formed on a separate substrate and communicatively coupled to the substrate 300 for light source 116 and the light sensor 118 (e.g., via an electrical connector between the substrates). In the example of FIG. 3, an imaging component 301 formed by the substrate 300, the camera 105, the light source 116, and the light sensor 118 is coupled to a connector 302 (e.g., a flexible integrated circuit) that communicatively couples the camera 105 to system circuitry (see, e.g., FIGS. 6-8) for the electronic device 100.

In the example of FIG. 3, the light source 116 and the light sensor 118 may be separated by a distance D that is less than, for example, 2 millimeters (mm), less than 1 mm, or less than 0.5 mm. By arranging the light source 116 and the light sensor 118 within the distance D, the light source 116 and the light sensor 118 can be positioned in sufficient proximity that masking the light source 116 (e.g., directly or by covering some or all of the opening 206) or damaging the light source 116 (e.g., with a pin or another sharp object) correspondingly masks or damages the light sensor 118.

Figure 4:
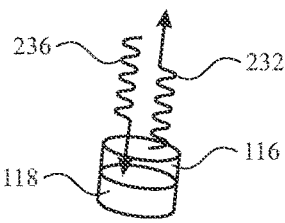
FIG. 4 illustrates an example arrangement of a light sensor and a light source for a camera of an electronic device in accordance with various aspects of the subject technology.
Figure 5:
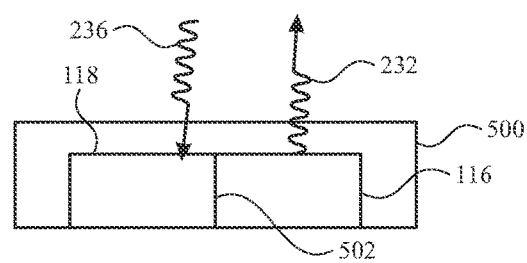
FIG. 5 illustrates another example arrangement of a light sensor and a light source for a camera of an electronic device in accordance with various aspects of the subject technology.

FIGS. 4 and 5 illustrate other arrangements of the light source 116 and the light sensor 118 that form the light source 116 and the light sensor 118 co-located in sufficient proximity that masking or destroying the light source to prevent the projection of the light out of the housing correspondingly masks or destroys the light sensor.

In the example of FIG. 4, the light source 116 and the light sensor 118 are formed as a stacked emitter/receiver component in which light 236 must pass through at least a portion of the light source 116 in order to pass from the external environment to the light sensor. In this configuration, masking or destroying the light source 116 to prevent the projection of the light 232 out of the housing correspondingly masks or destroys the light sensor 118.

In the example of FIG. 5, the light source 116 and the light sensor 118 are formed as elements of a common package having a package housing 500 through which light 232 and 236 passes from light source 116 and to light sensor 118, respectively. In this configuration, damage to the package housing 500 that prevents light 232 from being projected from light source 116 correspondingly prevents light 236 from exiting through the damaged package housing. In one or more implementations, a light barrier 502 may be provided that prevents light generated by the light source 116 from reaching the light sensor 118. However, in other implementations, a portion of the light from light source 116 may be directed to and/or be detectable by the light sensor 118 (e.g., to allow the light sensor 118 to verify that the light source 116 is generating light).

Figure 6:
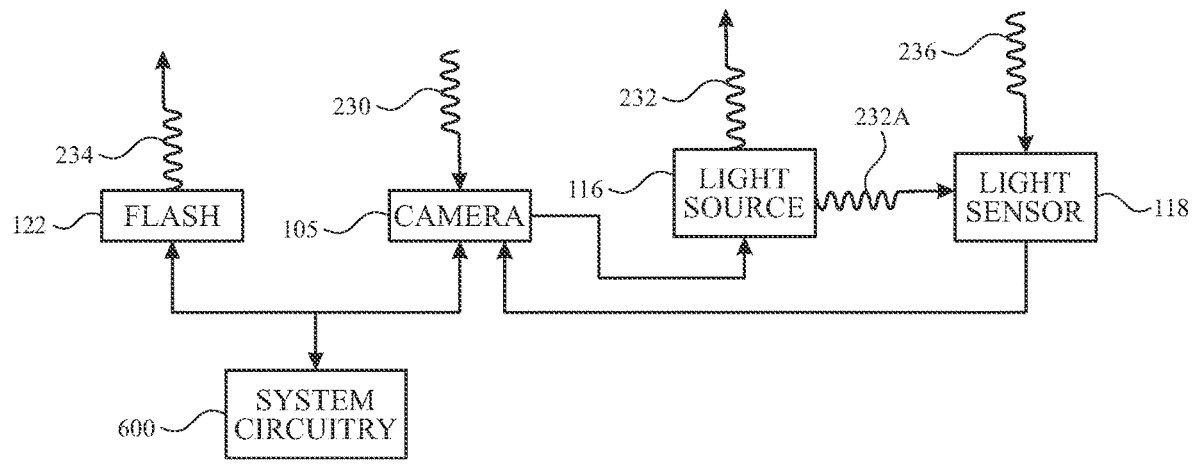
FIG. 6 illustrates a schematic view of example circuitry for an electronic device in accordance with various aspects of the subject technology.

FIG. 6 illustrates a schematic diagram of various components of electronic device 100 in accordance with aspects of the subject technology. As shown in FIG. 6, camera 105 may be communicatively coupled to system circuitry for the electronic device, such as system circuitry 600. System circuitry may include one or more processors, memory, and/or other circuitry for running an operating system and/or various applications for the electronic device (e.g., a camera application and/or other applications that access the camera 105), and/or for operating one or more components of the device. For example, camera 105 may be configured to receive power from system circuitry 600 for the electronic device 100 and/or to read out image data and/or other captured data to the system circuitry 600.

As shown in FIG. 6, the light source 116 may be communicatively uncoupled from the system circuitry 600 and configured to receive power from the camera 105 (e.g., at all times during which the camera is operating). In this way, the light source 116 is configured as an indicator light for the camera 105, and is insulated from, for example, a hack of the system circuitry 600 and/or the camera 105. As indicated in FIG. 6, the light sensor 118 may be hardwired to the camera and inaccessible by the system circuitry 600. Responsive to receiving light 236 from external to the device and above a threshold, the light sensor 118 may provide a signal to camera 105 that allows the camera to be activated and/or to continue to operate. Responsive to an amount of light 236 that is below the threshold, light sensor 118 may provide a different signal to the camera to prevent activation of or continued operation of the camera, or may discontinue providing the signal to camera 105 that allows the camera to be activated and/or to continue to operate. As shown in the example of FIG. 6, the light sensor 118 can control the activation/operation of the camera 105 via direct communication with the camera, and without communicating with the system circuitry 600.

As shown in FIG. 6, in one or more implementations, light sensor 118 may be configured to receive light 232A from the light source when the light source 116 is operating. Light sensor 118 may also, or alternatively, disable the camera 105 when an amount of the light 232A from the light source 116 is below a second threshold. For example, the light sensor 118 may detect the light 236 and the light 232A separately (e.g., using multiple sensor elements such as a first sensor element configured to detect a wide range of visible light wavelengths that are common in sunlight and/or common interior lighting, and a second sensor element configured to detect a narrow range of wavelengths that are emitted by the light source 116), and compare the amount of the light 236 to a first threshold and the amount of the light 232A to a second threshold. For example, light source 116 may be a substantially green source that emits light in a narrow band of green wavelengths, and the light sensor 118 may include a separate sensing element configured to sense light in the narrow band of green wavelengths. In another example, the light source 116 may emit a known amount of infrared light (e.g., from a separate infrared emitting element and in addition to the visible light 232 for indicating that the camera is on) that can be detected by an infrared sensing element in the light sensor 118. By detecting light 232A separately from light 236 from the ambient environment, the light sensor 118 can disable or prevent activation of the camera 105 in scenarios in which the light sensor 118 receives ambient light from external to the device, but the light source 118 is not operating.

In one or more other implementations, light sensor 118 may allow or prevent operation of the camera 105 based on a total amount of light received at the light sensor (e.g., a combination of the light 232 from external to the device and the light 232A from light source 116), such as by using a single sensing element, and comparing the total amount of light to a single threshold (e.g., a threshold that is set based on a known expected amount of light 232A and a predetermined or adjustable minimum amount of external light).

Figure 7:
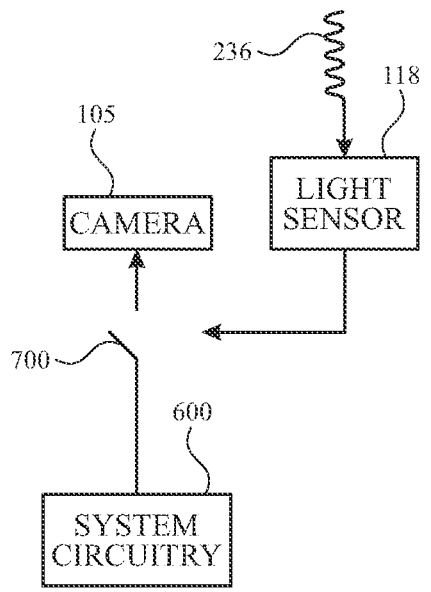
FIG. 7 illustrates a schematic view of an example arrangement of a light sensor configured to prevent operation of a camera in accordance with various aspects of the subject technology.
Figure 8:
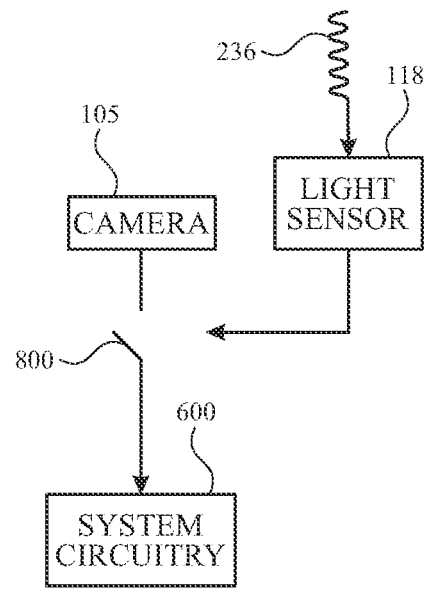
FIG. 8 illustrates a schematic view of another example arrangement of a light sensor configured to prevent operation of a camera in accordance with various aspects of the subject technology.

Signal(s) from light sensor 118 may be processed by circuitry of the camera 105 and/or may be used to allow or interrupt signals between the camera 105 and the system circuitry 600, to allow or prevent activation/operation of the camera. For example, in one or more implementations, the light sensor 118 may be coupled to a switch that is operable responsive to a sensor signal from the light sensor 118 to prevent the activation of the camera or deactivate the camera. FIGS. 7 and 8 illustrate examples in which the signal(s) from the light sensor 118 are coupled to a switch for control of the communication between the camera 105 and the system circuitry 600.

In the example of FIG. 7, the light sensor 118 is configured to enable and/or disable the camera 105 by allowing and/or preventing power and/or other control signals provided by system circuitry 600 of the electronic device from reaching the camera 105. For example, a signal from the light sensor 118 that increases or decreases with the amount of light (e.g., light 232 and/or 232A) received by the light sensor may be provided as a control signal to open and/or close a switch 700 along a power line or other control line from the system circuitry 600 to the camera 105 (e.g., by providing the light sensor signal to the gate terminal of a transistor along the power line in one illustrative example). For example, when sufficient light 232 and/or 232A is received by the light sensor 118 (e.g., indicating that the light source 116 is operating and/or capable of projecting light out of the housing), the signal from the light sensor 118 may close the switch 700 to allow power to reach the camera 105 from the system circuitry 600, and when insufficient light 232 and/or 232A is received by the light sensor 118 (e.g., indicating that the light source 116 is not operating and/or is blocked from projecting light out of the housing), the signal from the light sensor may open the switch 700 to prevent the power from the system circuitry 600 from reaching the camera 105.

In the example of FIG. 8, the light sensor 118 is configured to enable and/or disable the camera 105 by allowing and/or preventing output from the camera 105 to the system circuitry 600. For example, a signal from the light sensor 118 that increases or decreases with the amount of light (e.g., light 232 and/or 232A) received by the light sensor may be provided as a control signal to open and/or close a switch 800 along a communications line from the camera 105 to the system circuitry 600 (e.g., by providing the light sensor signal to the gate terminal of a transistor along the communications line in one illustrative example). For example, when sufficient light 232 and/or 232A is received by the light sensor 118, the signal from the light sensor may close the switch 800 to allow output from the camera 105 to the system circuitry 600, and when insufficient light 232 and/or 232A is received by the light sensor 118, the signal from the light sensor may open the switch 800 to prevent the output from the camera 105 from reaching the system circuitry 600.

Although the switches 700 and 800 of FIGS. 7 and 8 are illustrated as being external to the camera, in one or more implementations, switch 700 and/or switch 800 and/or one or more additional and/or other components for enabling/disabling the camera 105 responsive to the signal(s) from the light sensor) may be implemented as a part of the circuitry of the camera 105. Although a single light sensor 118 is depicted in FIGS. 7 and 8 as controlling the switches 700 and 800, in other implementations, multiple light sensors 118 (e.g., each having a corresponding indicator light source co-located therewith) can feed into the control mechanism (e.g., switch 700, switch 800, or another control mechanism) for camera 105 (e.g., so that multiple light sensors 118 must be receiving external light and/or detected to be emitting light in order to allow operation/activation of the camera).

Figure 9:
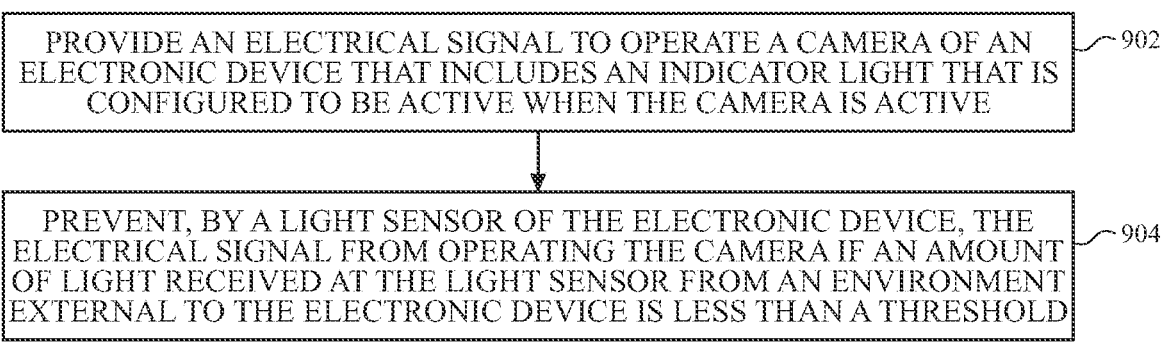
FIG. 9 illustrates a flow chart of an example process for operating an electronic device having a camera, a light source, and a light sensor in accordance with various aspects of the subject technology.

FIG. 9 depicts a flow diagram of an example process 900 for operating an electronic device having a camera, an indicator light, and a light sensor, in accordance with various aspects of the subject technology. For explanatory purposes, the example process of FIG. 9 is described herein with reference to the components of FIGS. 1-8. Further for explanatory purposes, the blocks of the example process of FIG. 9 are described herein as occurring in series, or linearly. However, multiple blocks of the example process of FIG. 9 may occur in parallel. In addition, the blocks of the example process of FIG. 9 need not be performed in the order shown and/or one or more of the blocks of the example process of FIG. 9 need not be performed.

In the depicted example flow diagram, at block 902, an electrical signal is provided (e.g., from system circuitry 600 of an electronic device such as electronic device 100) to operate a camera (e.g., camera 105) of an electronic device (e.g., electronic device 100) that includes an indicator light (e.g., light source 116) that is configured to be active when the camera is active (e.g., at all times when the camera is operating to capture images and/or other information).

At block 904, a light sensor (e.g., light sensor 118) of the electronic device may prevent the electrical signal from operating the camera if an amount of light received at the light sensor from an environment external to the electronic device is less than a threshold. Preventing the electrical signal from operating the camera may include preventing the electrical signal from activating the camera when the camera is inactive, or may include deactivating the camera when the camera is active. The light sensor may be disposed adjacent to the indicator light (e.g., to detect an approximate amount of light from the environment external to the electronic device that reaches the light source to indicate whether the light source has a clear path to emit light to the external environment).

In one or more implementations, the light sensor may deactivate, disable, or otherwise prevent operation or activation of the camera by preventing power provided by system circuitry of the electronic device from reaching the camera. In one or more implementations, the light sensor may deactivate, disable, or otherwise prevent operation or activation or the camera by preventing output from the camera from reaching the system circuitry for the device.

In one or more implementations, the threshold may be a first threshold corresponding to an amount of light from the environment external to the electronic device. The light sensor may prevent the electrical signal from operating the camera if a first amount of light received at the light sensor from an external environment of the electronic device is less than the first threshold. In one or more implementations, the light sensor may also, or alternatively, prevent the electrical signal from operating the camera when a second amount of light received from the light source is less than a second threshold.

In one or more implementations, preventing the electrical signal from operating the camera if the amount of light received at the light sensor from the environment external to the electronic device is less than the threshold may include receiving, by the light sensor during a first period of time, a first amount of light from the environment external to the electronic device, the first amount of light greater than the threshold; allowing, by the light sensor, the electrical signal to operate the camera during the first period of time; receiving, by the light sensor during a second period of time after the first period of time, a second amount of light from the environment external to the electronic device, the second amount of light less than the threshold; and preventing, by the light sensor, the electrical signal from operating the camera during the second period of time.

As another example, in one or more implementations, the electrical signal to operate the camera may be an electrical signal to activate the camera from an inactive state, and preventing the electrical signal from operating the camera if the amount of light received at the light sensor from the environment external to the electronic device is less than the threshold may include receiving, by the light sensor prior to providing the electrical signal, an amount of light from the environment external to the electronic device that is less than the threshold. Preventing the electrical signal from operating the camera if the amount of light received at the light sensor from the environment external to the electronic device is less than the threshold may also include preventing, by the light sensor and responsive to receiving the amount of the light from the environment external to the electronic device that is less than the threshold, the electrical signal from activating the camera.

In one or more implementations, the electronic device may also include an ambient light sensor (e.g., ALS 120). In one or more implementations, the first threshold may be adjustable based on an amount of ambient light as measured by the ambient light sensor. In this way, the camera can be allowed to operate in low light conditions (e.g., when both the ambient light sensor 120 and the light sensor 118 receive low amounts of light from the external environment) as long as the light source 116 is operational.

Although various examples are described herein in which a light source is implemented as an indicator light for a camera, it should be appreciated that a light sensor can also, or alternatively, be provided in association with indicator lights for other components and/or processes of an electronic device.

The present disclosure recognizes that the use of such personal information data, in the present technology, can be used to the benefit of users. For example, the personal information data can be captured by a camera in an image.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of capturing images by a camera, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
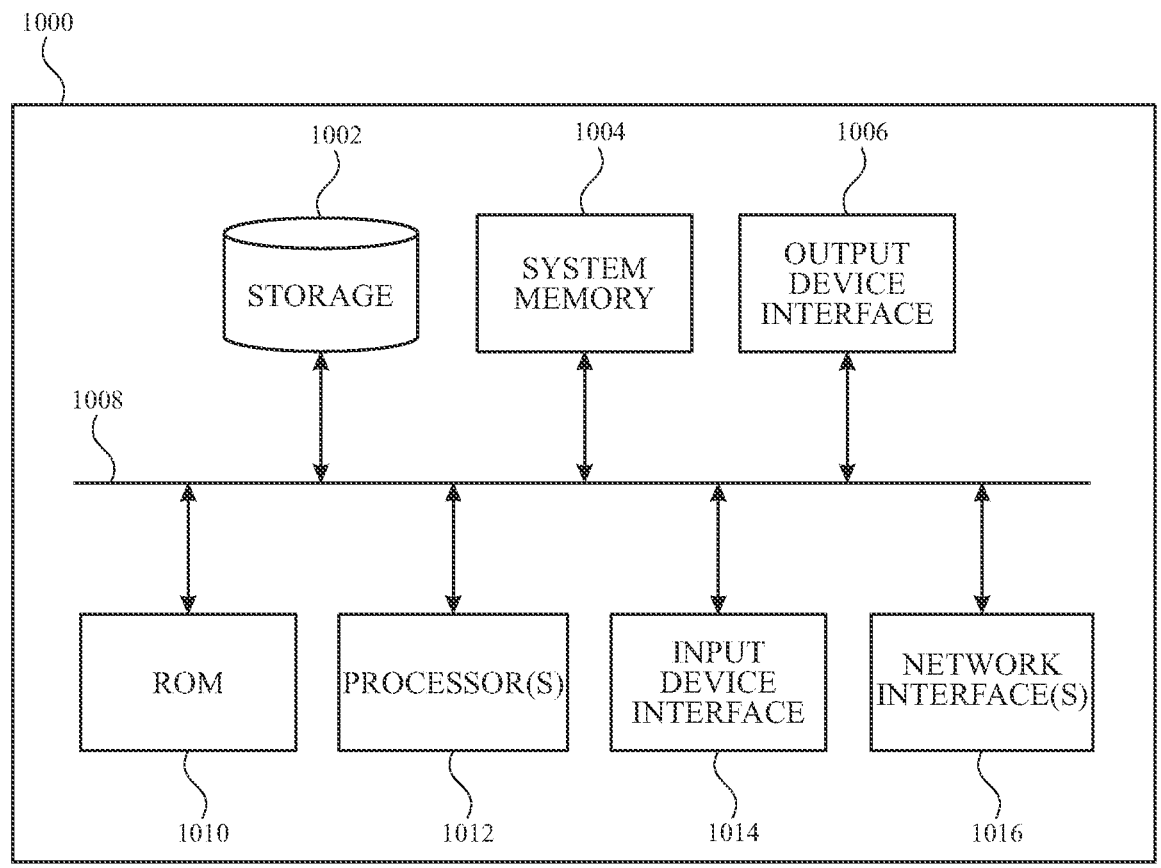
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, electronic device 100 shown in FIG. 1 and/or FIG. 3. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010.

From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, a display such as display 104 of FIG. 1. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 100 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

In accordance with other aspects of the subject disclosure, an electronic device is provided that includes a housing; a camera disposed within the housing and configured to capture images of an environment external to the housing; a light source disposed within the housing and configured to project light out of the housing at all times during which the camera is operating; and a light sensor disposed within the housing adjacent to the light source and configured to: receive light from the external environment; and disable the camera if an amount of light received by the light sensor is below a threshold.

In accordance with other aspects of the subject disclosure, a method is provided that includes providing an electrical signal to operate a camera of an electronic device that includes an indicator light that is configured to be active when the camera is active; and preventing, by a light sensor of the electronic device, the electrical signal from operating the camera if an amount of light received at the light sensor from an environment external to the electronic device is less than a threshold.

In accordance with other aspects of the subject disclosure, an electronic device is provided that includes a camera; a light source configured to be active whenever the camera is active; and a light sensor disposed adjacent to the light source and configured to prevent activation of the camera or deactivate the camera when at least one of: a first amount of light received at the light sensor from an external environment of the electronic device is less than a first threshold; and a second amount of light received from the light source is less than a second threshold.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device, comprising:
a housing;
a camera disposed within the housing and configured to capture images of an environment external to the housing;
a light source disposed within the housing and configured to project light out of the housing at all times during which the camera is operating; and
a light sensor disposed within the housing adjacent to the light source and configured to:
receive light from the external environment; and
disable the camera if an amount of light received by the light sensor is below a threshold.

2. The electronic device of claim 1, wherein the light source and the light sensor are co-located within the housing in sufficient proximity that masking or destroying the light source to prevent the projection of the light out of the housing correspondingly masks or destroys the light sensor.

3. The electronic device of claim 2, wherein the light source and the light sensor are disposed on a common substrate.

4. The electronic device of claim 3, wherein the camera is disposed on the common substrate.

5. The electronic device of claim 1, wherein the camera, the light source, and the light sensor are disposed adjacent to a transparent portion of the housing, wherein the electronic device comprises a masking layer on the transparent portion of the housing, the masking layer having an opening that is aligned with the light source and the light sensor to allow light to pass through the opening to the light sensor and through the opening from the light source.

6. The electronic device of claim 1, wherein the light sensor is configured to disable the camera if the amount of light received by the light sensor is below the threshold by disabling the camera if the amount of the light from the external environment is below the threshold.

7. The electronic device of claim 6, wherein the threshold is a first threshold, and wherein the light sensor is further configured to:
receive light from the light source when the light source is operating; and
disable the camera when an amount of the light from the light source is below a second threshold.

8. The electronic device of claim 7, further comprising an ambient light sensor, wherein the first threshold is adjustable based on an amount of ambient light as measured by the ambient light sensor.

9. The electronic device of claim 1, wherein the camera is configured to receive power from system circuitry for the electronic device, wherein the light source is communicatively uncoupled from the system circuitry and configured to receive power from the camera at all times during which the camera is operating, and wherein the light sensor is hardwired to the camera and inaccessible by the system circuitry.

10. The electronic device of claim 1, wherein the light sensor is configured to disable the camera by preventing power provided by system circuitry of the electronic device from reaching the camera.

11. The electronic device of claim 1, wherein the light sensor is configured to disable the camera by preventing output from the camera.

12. The electronic device of claim 1, wherein the light sensor is hardwired to the camera.

13. A method, comprising:
providing an electrical signal to operate a camera of an electronic device that includes an indicator light that is configured to be active when the camera is active; and
preventing, by a light sensor of the electronic device, the electrical signal from operating the camera if an amount of light received at the light sensor from an environment external to the electronic device is less than a threshold.

14. The method of claim 13, further comprising:
receiving, by the light sensor during a first period of time, a first amount of light from the environment external to the electronic device, the first amount of light greater than the threshold;
allowing, by the light sensor, the electrical signal to operate the camera during the first period of time,
wherein preventing the electrical signal from operating the camera if the amount of light received at the light sensor from the environment external to the electronic device is less than the threshold comprises:
receiving, by the light sensor during a second period of time after the first period of time, a second amount of light from the environment external to the electronic device, the second amount of light less than the threshold; and preventing, by the light sensor, the electrical signal from operating the camera during the second period of time.

15. The method of claim 13, wherein the electrical signal to operate the camera comprises an electrical signal to activate the camera from an inactive state, and wherein preventing the electrical signal from operating the camera if the amount of light received at the light sensor from the environment external to the electronic device is less than the threshold comprises:

receiving, by the light sensor prior to providing the electrical signal, an amount of light from the environment external to the electronic device that is less than the threshold; and preventing, by the light sensor and responsive to receiving the amount of the light from the environment external to the electronic device that is less than the threshold, the electrical signal from activating the camera.

16. The method of claim 13, wherein the light sensor is disposed adjacent to the indicator light.

17. The method of claim 13, wherein the light sensor is hardwired to the camera.

18. An electronic device, comprising:
a camera;
a light source configured to be active whenever the camera is active; and
a light sensor disposed adjacent to the light source and configured to prevent activation of the camera or deactivate the camera when at least one of:
a first amount of light received at the light sensor from an external environment of the electronic device is less than a first threshold; and
a second amount of light received from the light source is less than a second threshold.

19. The electronic device of claim 18, wherein the light sensor and the light source are disposed in sufficient proximity that masking or destroying the light source to prevent the projection of the light out of the housing correspondingly masks or destroys the light sensor.

20. The electronic device of claim 18, wherein the light source comprises an indicator light for the camera.

21. The electronic device of claim 18, further comprising a flash for the camera, and an ambient light sensor that is separate from the light source.

22. The electronic device of claim 18, wherein the light sensor is coupled to a switch that is operable responsive to a sensor signal from the light sensor to prevent the activation of the camera or deactivate the camera.

23. The electronic device of claim 18, wherein the light sensor is hardwired to the camera.

* * * * *